US 8,035,846 B2

(12) United States Patent
Mitani (10) Patent No.: US 8,035,846 B2
(45) Date of Patent: Oct. 11, 2011

(54) PRINT ATTRIBUTE SETTING APPARATUS, PRINT ATTRIBUTE SETTING METHOD, AND PRINT ATTRIBUTE SETTING PROGRAM

(75) Inventor: Masateru Mitani, Shizuoka-ken (JP)

(73) Assignees: Kabushiki Kaisha Toshiba (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/507,231

(22) Filed: Jul. 22, 2009

(65) Prior Publication Data

US 2010/0007903 A1 Jan. 14, 2010

Related U.S. Application Data

(63) Continuation of application No. 10/768,696, filed on Feb. 2, 2004, now Pat. No. 7,576,887.

(30) Foreign Application Priority Data

Feb. 28, 2003 (JP) ................................ 2003-052718

(51) Int. Cl.
*H04N 1/40* (2006.01)
(52) U.S. Cl. ........................ 358/1.18; 358/468; 358/449
(58) Field of Classification Search ................... 358/1.2, 358/1.9, 2.1, 1.15–1.18, 468, 449, 451, 488, 358/498, 528
See application file for complete search history.

(56) References Cited

U.S. PATENT DOCUMENTS

| 4,686,577 | A | * | 8/1987 | Arimoto .................... 358/449 |
| 4,777,515 | A | * | 10/1988 | Aikoh et al. ............... 355/64 |
| 6,081,687 | A | * | 6/2000 | Munemori et al. ........... 399/374 |
| 6,961,069 | B2 | | 11/2005 | Hashimoto |
| 7,251,045 | B2 | | 7/2007 | Yamamura et al. |

FOREIGN PATENT DOCUMENTS

JP       2002-094773 A       3/2002

OTHER PUBLICATIONS

M. Masateru, U.S. PTO Office Action, U.S. Appl. No. 10/768,696, dated Jan. 10, 2008, 9 pgs.
M. Masateru, U.S. PTO Final Office Action, U.S. Appl. No. 10/768,696, dated Jul. 9, 2008, 7 pgs.
M. Masateru, U.S. PTO Office Action, U.S. Appl. No. 10/768,696, dated Oct. 27, 2008, 7pgs.
M. Masateru, U.S. PTO Notice of Allowance, U.S. Appl. No. 10/768,696, dated Apr. 16, 2009, 6 pgs.

* cited by examiner

*Primary Examiner* — Thomas D Lee
*Assistant Examiner* — Stephen M Brinich
(74) *Attorney, Agent, or Firm* — Foley & Lardner LLP (57) ABSTRACT

Print attributes are set in print type where a plurality of original paper images are arranged on at least one surface of print paper so that useless print can be prevented. A print attribute for defining a specific relationship between an original paper size and a print paper size is provided as one of the print attributes of the print type, one print attribute is selected from a plurality of options so that the specific relationship between the original paper size and the print paper size is set. As a result, a combination of the original paper size and the print paper size intended by a user can be set securely even in the above print type, so that useless print can be prevented securely.

15 Claims, 6 Drawing Sheets

| PRINT PAPER SIZE/ ORIGINAL PAPER SIZE | COMPLETION OUTPUT SIZE |
|---|---|
| A4 | A5 Booklet on A4 |
| A3 | A4 Booklet on A3 |
| B4 | B5 Booklet on B4 |
| Letter | 1/2 LT Booklet on LT |
| Ledger | LT Booklet on LD |
| A5 | A6 Booklet on A5 |
| B5 | B6 Booklet on A5 |
| Legal | 1/2 LG Booklet on LG |
| Computer | 1/2 Comp Booklet on Comp |
| Folio | 1/2 Folio Booklet on Folio |
| Statement | 1/2 Statement Booklet on Statement |
| 13LG | 1/2 13LG Booklet on 13LG |
| 8.5SQ | 1/2 8.5SQ Booklet on 8.5SQ |

| COMPLETION OUTPUT SIZE | PRINT PAPER SIZE/ ORIGINAL PAPER SIZE |
|---|---|
| A5 Booklet on A4 | A4 |
| A4 Booklet on A3 | A3 |
| B5 Booklet on B4 | B4 |
| 1/2 LT Booklet on LT | Letter |
| LT Booklet on LD | Ledger |
| A6 Booklet on A5 | A5 |
| B6 Booklet on A5 | B5 |
| 1/2 LG Booklet on LG | Legal |
| 1/2 Comp Booklet on Comp | Computer |
| 1/2 Folio Booklet on Folio | Folio |
| 1/2 Statement Booklet on Statement | Statement |
| 1/2 13LG Booklet on 13LG | 13LG |
| 1/2 8.5SQ Booklet on 8.5SQ | 8.5SQ | ns/768,696, filed Feb. 2, 2004, the entire con-

PRINT ATTRIBUTE SETTING APPARATUS, PRINT ATTRIBUTE SETTING METHOD, AND PRINT ATTRIBUTE SETTING PROGRAM

The present application is a continuation of U.S. application Ser. No. 10/768,696, filed Feb. 2, 2004, the entire contents of which is incorporated herein by reference.

BACKGROUND OF THE INVENTION

1. Field of the Invention

The present invention relates to a print attribute setting apparatus, a print attribute setting method and a print attribute setting program which can be applied to a case where print attributes of a booklet print function are set in devices having a print function such as a printer, a copying machine, and a complex machine having a plurality of functions such as a print function and a copying function.

2. Description of the Related Art

A program which is called as a printer driver is installed into information processing devices such as personal computers, and the program makes printers print data in various files (hereinafter, original paper) via printer drivers. Such a printing method is widely used. When data are printed by a printer via the printer driver, mostly a user specifies a print paper size to be used.

Further, when original paper is printed, 2-in-1 print, with which original paper images for two pages are arranged on one side of paper so as to be printed, is used. Booklet print, in which a print page order of original paper is suitably changed and the 2-in-1 print is executed on both sides of paper, so that a booklet is made by folding a center of the paper, is used (Japanese Patent Application Laid-Open (JP-A) No. 2002-94773).

When original paper with A4 size is printed as a booklet, for example, the following two methods are used. (1) Original paper images with A4 size for two pages are arranged on front and rear surfaces of paper with A3 size so that a booklet with A4 size is made (equal-scale print). (2) Original paper images with A4 size for two pages are arranged on front and rear surfaces of paper with A4 size so that a booklet with A5 size is made (reduction print). An original paper size and a print paper size having different reduction scale may be combined here.

In the prior arts including JP-A No. 2002-94773, only a print paper size is specified (for example, an original paper size is default-specified of a text file), or a print paper size and an original paper size are specified, so that the printer driver automatically determines booklet print with equal scale or booklet print with reduction scale based on a combination of the print paper size and the original paper size.

Even when a user specifies the print paper size or the original paper size, however, clear display is not given at the time of specifying booklet print, and thus the booklet print which does not meet a user's intention is possibly executed. When such booklet print is executed, the booklet is wasted.

Such a problem arises not only in the case of the booklet print using a printer via a printer device, but also in the case of printing devices such as a copying machine and a complex machine.

The similar problem arises not only in the booklet print but also in a print function where a plurality of original paper images are arranged on at least one surface (front or rear surface) of a print paper.

For this reason, a print attribute setting apparatus, a print attribute setting method and a print attribute setting program which can securely prevent useless print are desired even in the print type having print attributes defined by specifying a print paper size and an original paper size where a plurality of original paper images are arranged on at least one surface (front or rear surface) of print paper.

SUMMARY OF THE INVENTION

In order to solve the above problem, a print attribute setting apparatus according to a first aspect of the invention, for setting print attributes of print type in which a plurality of original paper images are arranged on at least one surface of print paper, includes: size relationship option storage means for storing a plurality of options for specifying a specific relationship between an original paper size and a print paper size in the print type therein; and size relationship attribute setting means for setting one of the options stored in the size relationship option storage means as one print attribute of the print type.

A print attribute setting method according to a second aspect of the invention, for setting print attributes of print type where a plurality of original paper images are arranged on at least one surface of print paper, includes: size relationship attribute setting process for pre-storing a plurality of options for defining a specific relationship between an original paper size and a print paper size in the print type, and setting one of the pre-stored options as one print attribute of the print type.

A print attribute setting program according to a third aspect of the invention, for setting print attributes of print type where a plurality of original paper images are arranged on at least one surface of print paper, includes: a plurality of option data for specifying a specific relationship between an original paper size and a print paper size in the print type as fixed data; and a size relationship attribute setting process routine which executes a size relationship attribute setting process for setting one of the pre-stored options as one print attribute of the print type and is described by codes executable by a computer.

According to the first to the third aspects of the invention, when a user sets print attributes of print type in which a plurality of original paper images are arranged on at least one surface of print paper, the user selects the print attributes from a plurality of options for defining a specific relationship between an original paper size and a print paper size, so as to define the original paper size and the print paper size. For this reason, a combination of the original paper size and the print paper size intended by the user can be securely set in the print type in which a plurality of original paper images are arranged on at least one surface of print paper. As a result, useless print can be securely prevented.

DETAILED DESCRIPTION OF THE PREFERRED EMBODIMENTS

One embodiment of a print attribute setting apparatus, a print attribute setting method and a print attribute setting program according to the present invention is explained in detail below with reference to the accompanying drawings. The embodiment is characterized by specifying of print attributes of booklet print.

Figure 1:
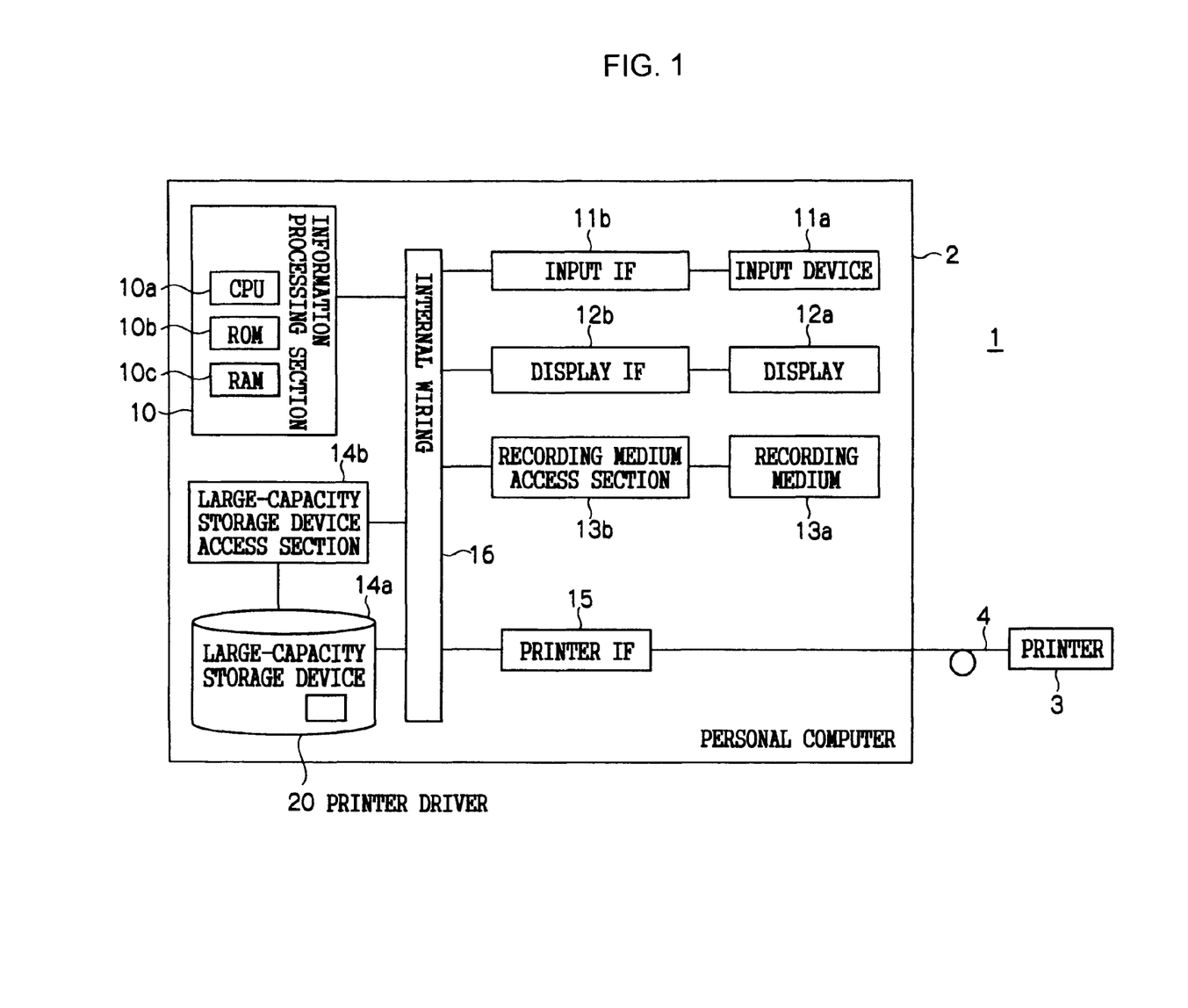
FIG. 1 is a block diagram illustrating an entire structure of an information processing system to which a print attribute setting apparatus according to the embodiment is applied.

FIG. 1 is a block diagram illustrating an entire structure of an information processing system to which the print attribute setting apparatus is applied according to the embodiment.

In FIG. 1, an information processing system 1 is configured by connecting an information processing device such as a personal computer (hereinafter, PC) 2 and a printer 3 via a printer cable 4.

The PC 2 has a structure similar to that of a general PC as a hardware. That is to say, the PC 2 has an information processing section 10, an input device 11a, an input interface section (input IF) 11b, a display 12a, a display interface section (display IF) 12b, a detachable recording medium 13a, a recording medium access section 13b, a large-capacity storage device 14a, a large-capacity storage device access section 14b, a printer interface section (printer IF) 15. The information processing section 10 is composed of a CPU 10a, a ROM 10b and a RAM 10c. The input device 11a includes built-in or external keyboard and mouse. The input interface section 11b fulfills an interface function with respect to the input device 11a. The display 12a includes a built-in or external liquid crystal display or CRT display. The display interface section 12b fulfills an interface function with respect to the display 12a. The detachable recording medium 13a includes a flexible disc, a CD-ROM or a memory card. The recording medium access section 13b accesses the detachable recording medium 13a. The large-capacity storage device 14a includes a hard disc. The large-capacity storage device access section 14b accesses the large-capacity storage device 14a. The printer interface section 15 fulfills an interface function with respect to the printer 3. These components are suitably connected by internal wiring 16.

Meanwhile, the printer 3 has a structure similar to that of a general printer, but description of the detailed structure is omitted. In the embodiment, the printer 3 may be a monochrome printer or a color printer, and its printing method may be such that a latent image is formed so as to be developed by a laser or print is executed by ink jet. Further, a printer in which a print paper size is set to only one type may be used, but in the this embodiment, a printer which can cope with a plurality of print paper sizes is particularly intended.

A printer driver 20 for the printer 3 (printer driving program; corresponds to the print attribute setting program of the embodiment) is installed into the large-capacity storage device 14a of the PC 2. The printer driver 20 (printer driving program) includes not only a program portion which is executed by the CPU 10a but also fixed data, default data, set data at that time, and the like.

Figure 2:
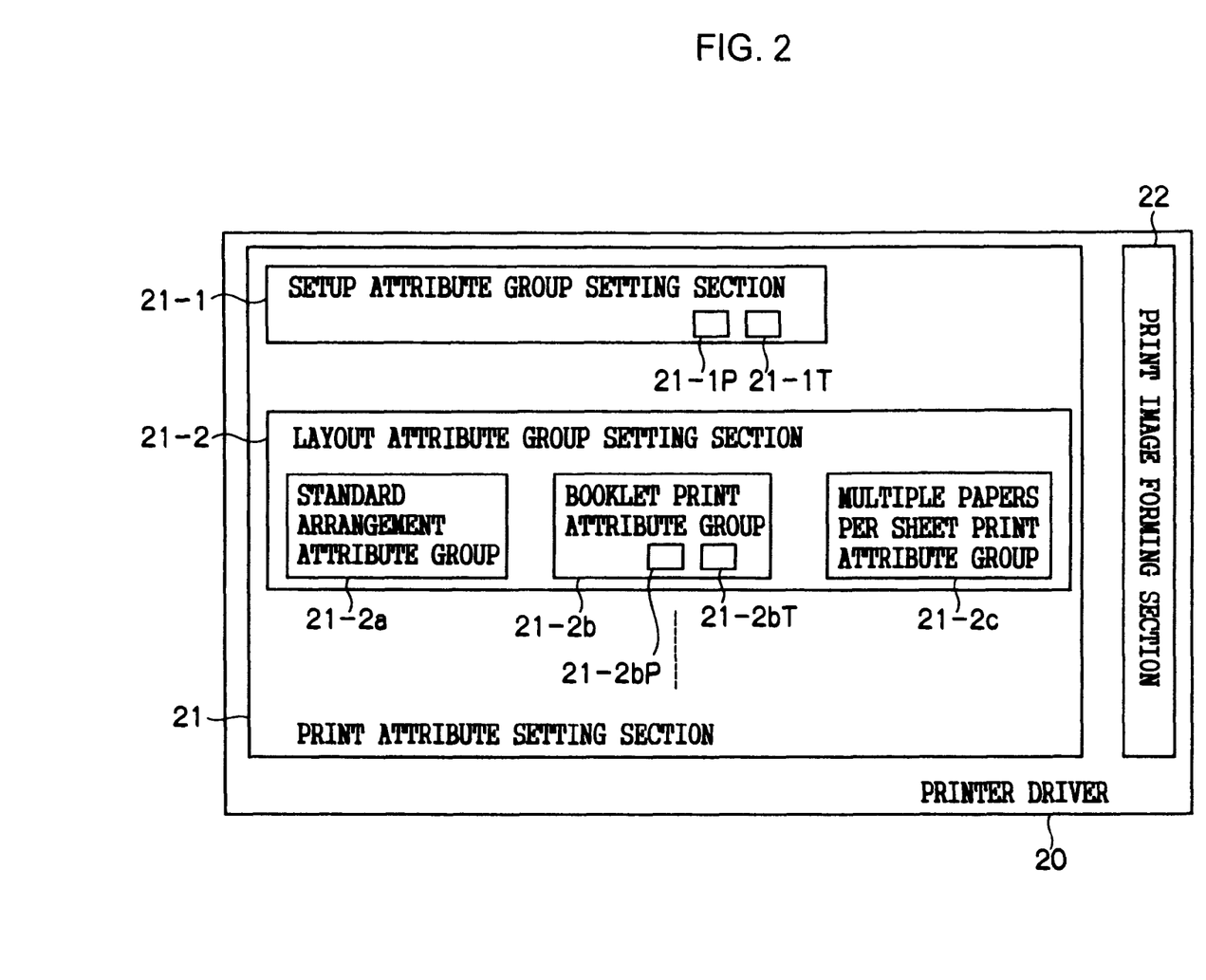
FIG. 2 is an explanatory diagram illustrating a schematic structure (program structure) of a printer driver of the embodiment.

FIG. 2 is an explanatory diagram illustrating a schematic structure (program structure) of the printer driver 20.

The printer driver 20 is roughly divided into a print attribute setting section 21 for setting print attributes, and a print image forming section 22 for forming a print image from information to be printed according to the set print attributes. The embodiment is characterized by the print attribute setting section 21, and an explanation of the print image forming section 22 is omitted.

In the embodiment, the print attributes are grouped from various viewpoints, and the groups are hierarchized. The print attribute setting section 21 is divided into setting sections 21-1, 21-2, . . . in a group unit in order to display in group unit and set respective print attributes.

Main print attributes such as an original paper size, a print paper size and a scale (a ratio of a print image to an original paper image) are print attributes in the setup attribute group (setting section) 21-1 where the setting image is displayed at the first time when a print command is given (setup).

Figure 5:
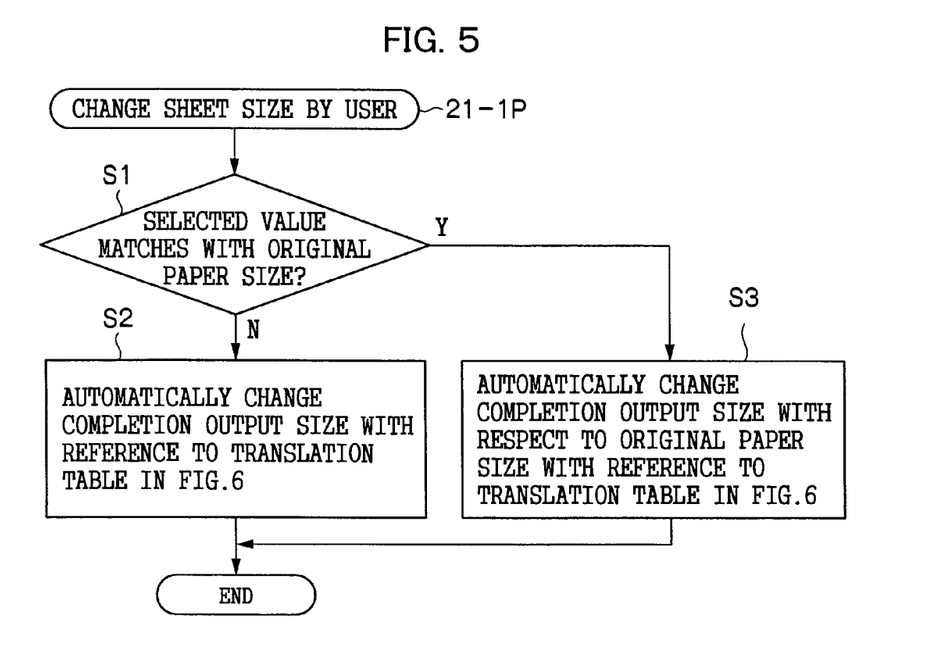
FIG. 5 is a flowchart illustrating a process for reviewing option of a completion output size of booklet print at the time of setting a print paper size according to the embodiment.

The setup attribute group setting section 21-1 includes a program 21-1P for reviewing options of a completion output size of booklet print at the time of setting the print paper size as shown in FIG. 5, mentioned later, and a translation table 21-1T shown in FIG. 6 used by the program 21-1P.

The print attributes for defining a layout of an original paper image with respect to print paper are print attributes in the layout attribute group 21-2. The layout attribute group (setting section) 21-2 is further divided into a standard arrangement print attribute group (Standard) 21-2a, a booklet print attribute group (Booklet) 21-2b, and a multiple papers per sheet attribute group 21-2c.

Figure 7:
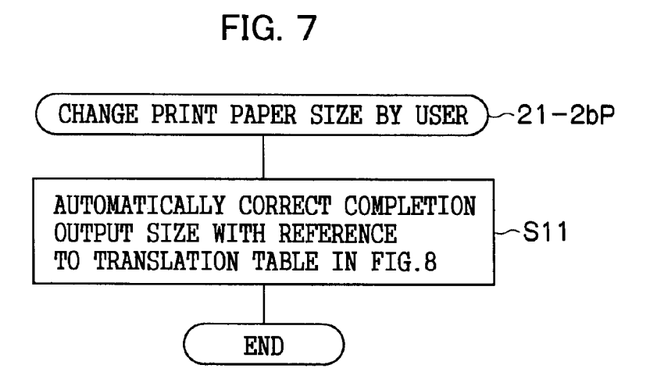
FIG. 7 is a flowchart illustrating a process for reviewing option of a print paper size at the time of setting the completion output size of the booklet print according to the embodiment.

The booklet print attribute group setting section 21-2b includes a program 21-2bP for reviewing options of a print paper size at the time of setting a completion output size of the booklet print as shown in FIG. 7, mentioned later, and a translation table 21-2b1T used by the program 21-2bP.

Figure 3:
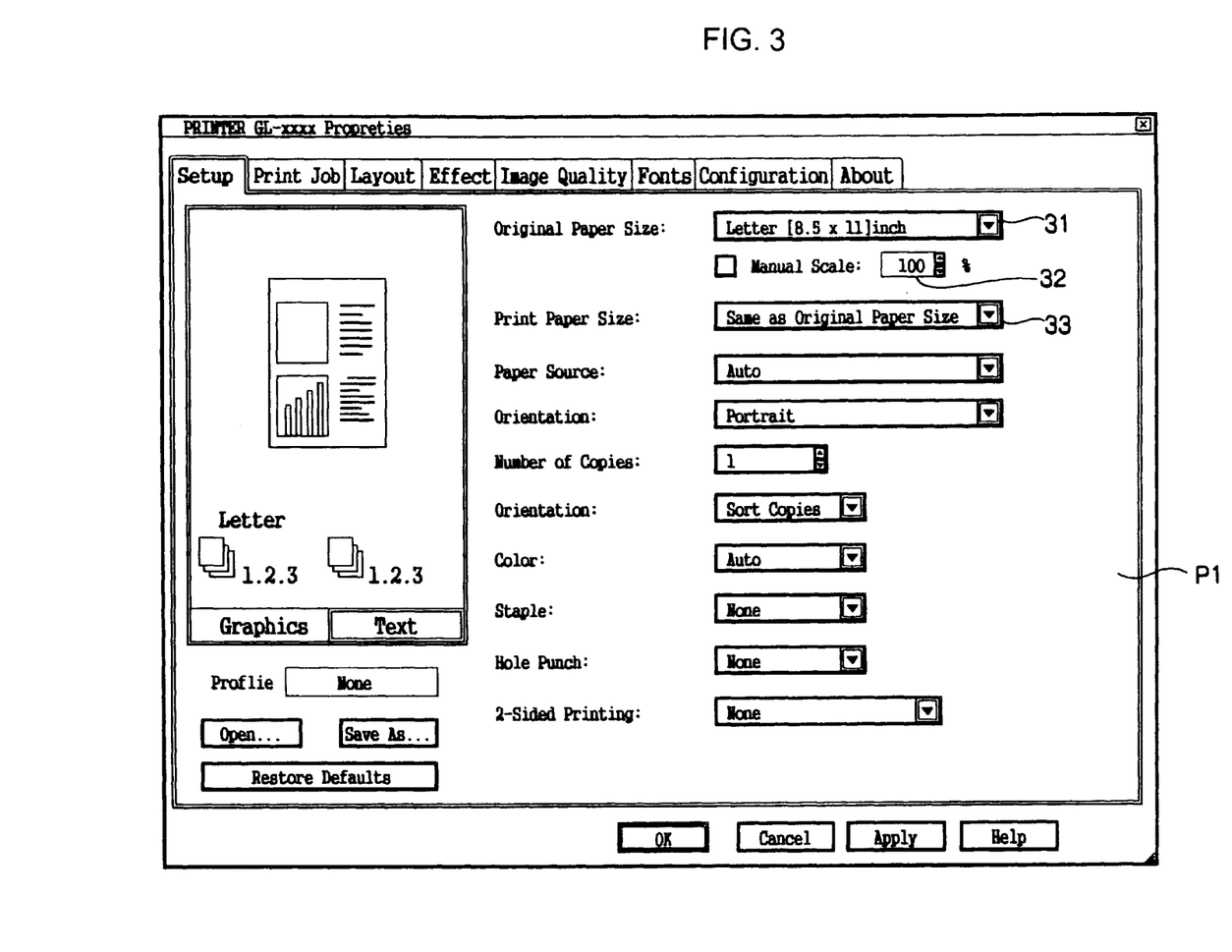
FIG. 3 is an explanatory diagram illustrating a setting image of print attributes in a setup attribute group according to the embodiment.
Figure 4:
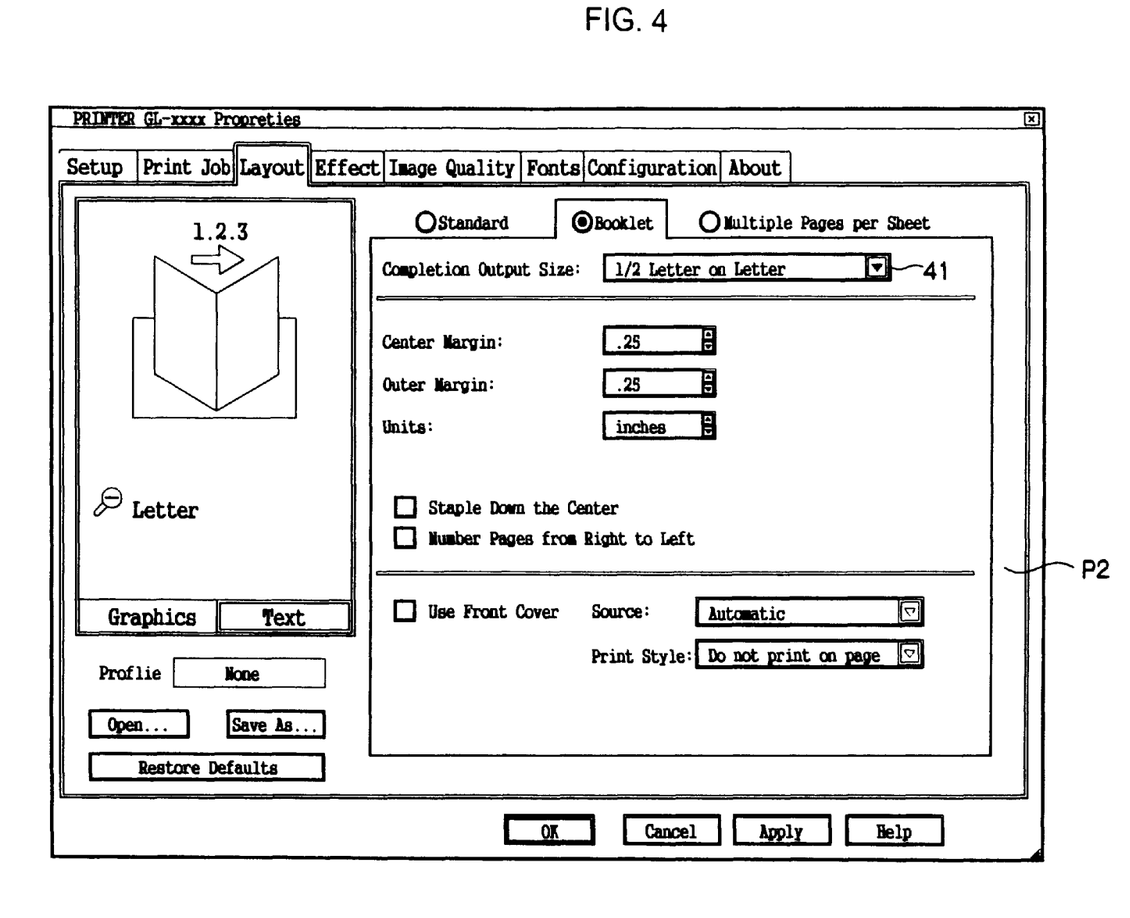
FIG. 4 is an explanatory diagram illustrating a setting image of print attributes in a booklet print attribute group which is in a low hierarchy of a layout attribute group according to the embodiment.

Although omitted in FIG. 2, another print attribute groups such as font selection and print effect are also present (see FIGS. 3 and 4).

The respective setting images of the print attributes include options having another group names in the highest hierarchy so that the display image can be switched immediately between the groups in the highest hierarchy (see FIGS. 3 and 4).

FIG. 3 is an explanatory diagram illustrating a setting image P1 of the print attribute of the setup attribute group 21-1.

As shown in FIG. 3, the setting image P1 of the print attributes in the setup attribute group 21-1 includes setting fields (combo boxes or edit boxes) 31 to 33 for an original paper size, a scale, and a print paper size. A user sets an arbitrary option on each box, so as to be capable of arbitrarily setting the original paper size, the scale and the print paper size.

FIG. 4 is an explanatory diagram illustrating a setting image P2 of the print attributes in the booklet print attribute group 21-2b in a low hierarchy of the layout attribute group 21-2.

As shown in FIG. 4, the setting image P2 includes a setting field (combo box) 41 of the completion output size of the booklet print. The user sets an arbitrary option on the combo box 41, so as to be capable of arbitrarily setting the completion output size of the booklet print.

The embodiment is characterized in that the user can set the completion output size of the booklet print.

The completion output size is expressed by a pair of "a size with which each page of original paper is printed" and "a print paper size which is actually used" such as a pair of "A4 Booklet on A3" and "A5 booklet on A4". The completion output size can clarify as to which of the above-mentioned two booklet printing methods is desired by the user when the original paper size is A4.

When the user desires to print a document or the like relating to an application software (hereinafter, application) executed by the CPU 10*a*, for example, the user operates a print instruction icon on the display screen relating to the application. At this time, the CPU 10*a* transmits entire or part of the printer driver 20 stored in the large-capacity storage device 14*a* to the RAM 10*c* according to an operation by the user, so as to execute the process of the printer driver 20.

Just after the user opens the printer driver 20 in the above manner, the setting image P1 of the print attributes in the setup attribute group 21-1 is displayed. These print attributes include a number of print, present or unpresent of staple, a print paper size, and the like which can be set on the image P1 and are used comparatively frequently. When original paper is created, normally a value specified in the application is displayed on the original paper size combo box 31. An initial value on the print paper size combo box 33 is the same as a value displayed on the original paper size combo box 31, and the initial value may be displayed, but "Same as Original Paper Size" is displayed. In order that the user uses paper with size other than the initial value, the user selects a desired size from print paper sizes supported by a printer such as A4 and A3 at the time of print.

When the booklet print is selected at the time of newly setting (changing) a print paper size on the print paper size combo box 33, the CPU 10*a* executes the program 21-1P for reviewing options of the completion output size of the booklet print shown in FIG. 5. When the print paper size is changed, the reviewing of various print attributes is executed, but FIG. 5 only shows the reviewing of the completion output size of the booklet print.

The CPU 10*a* determines whether the selected print paper size is the same as the original paper size (S1). When the selected print paper size is different from the original paper size, a value on the completion output size combo box 41 of the booklet print is changed into a value obtained from the translation table 21-1T in FIG. 6 using the print paper size as an input (S2). For example, when the selected print paper size is B4, the value on the completion output size combo box 41 of the booklet print is changed into "B5 booklet on B4". Meanwhile, when the selected print paper size is the same as the original paper size, the value on the completion output size combo box 41 of the booklet print is changed into a value obtained from the translation table 21-1T in FIG. 6 using the original paper size as an input (S3).

Figure 6:
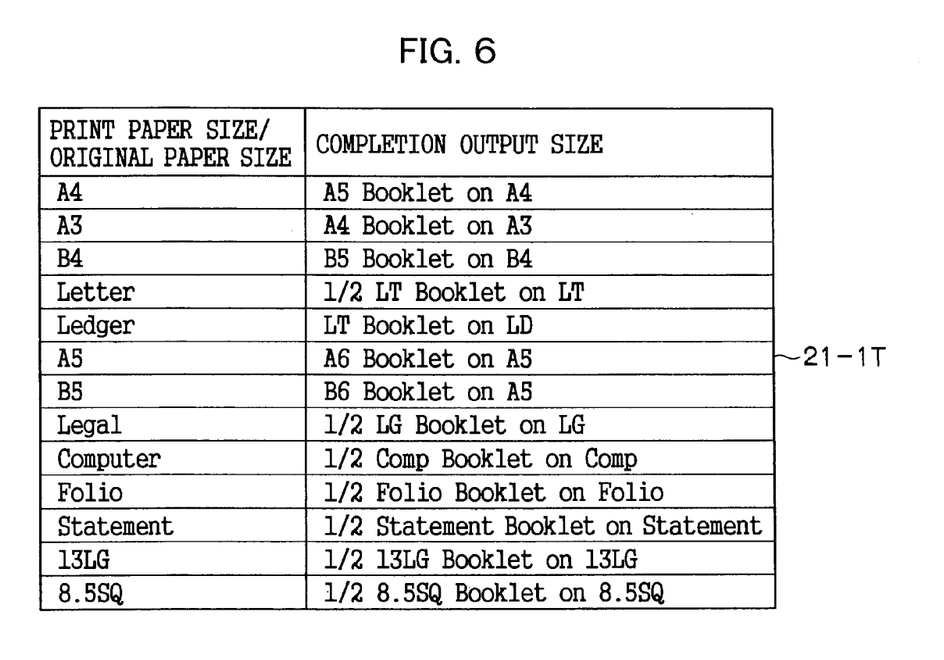
FIG. 6 is an explanatory diagram illustrating an example of a translation table to be used in the process in FIG. 5.

The print paper size or the original paper size is input into the translation table 21-1T in FIG. 6, and the translation table 21-1T outputs the corresponding completion output size of the booklet print.

The user who desires the booklet print makes the setting image P2 of the print attributes in the booklet print attribute group 21-2*b* which is the low hierarchy of the layout attribute group 21-2 shown in FIG. 4 be displayed and sets the print attributes.

On the setting image P2, the user can specify an interval with which 2-in-1 images are stuck, or can select which of a booklet which spreads to right and a booklet which spread to left is created at the time of the booklet print. On the completion output size combo box 41, the user can select a completion output size which is obtained by combining a size with which each page (original paper) is actually printed and a print paper size to be used for the print.

When the completion output size on the completion output size combo box 41 is newly set (changed), the CPU 10*a* executes the program 21-2*b*P for reviewing the option of the print paper size shown in FIG. 7.

Figure 8:
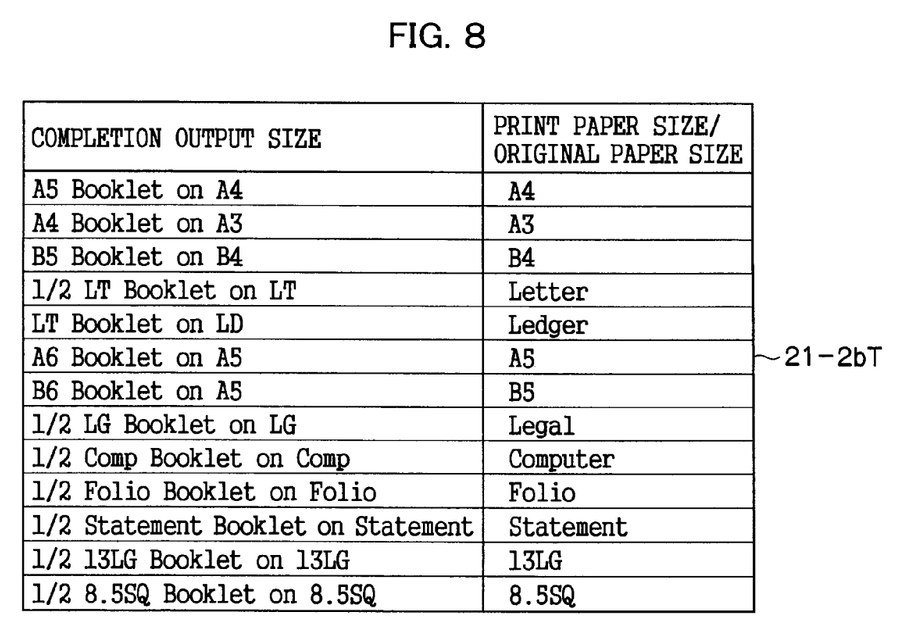
FIG. 8 is an explanatory diagram illustrating an example of a translation table to be used in the process in FIG. 7.

The CPU 10*a* changes the value on the print paper size combo box 33 into a value obtained from the translation table 21-2*b*T in FIG. 8 using the completion output size as an input (S10). For example, when "A5 booklet on A4" is newly selected as the completion output size, the CPU 10*a* sets the value on the print paper size combo box 33 to "A4".

The completion output size is input into the translation table 21-2*b*T in FIG. 8, and the translation table 21-2*b*T outputs the corresponding print paper size.

When the setting of various print attributes is completed, the user operates an execution key or an execution icon (represented by "OK" icon in FIGS. 3 and 4) even if any setting image relating to any group is displayed.

At this time, the CPU 10*a* converts original paper data to be printed (may be input by a word processor or the like, read by an image scanner, or imaged by an electron camera, namely, any input method may be used for the original paper) into data of the print image according to the set print attributes. The CPU 10*a* transmits the data to the printer 3, and the printer 3 prints the print image on paper.

According to the embodiment, the attribute such as the completion output size having the option for clarifying the original paper size and the print paper size is provided for the booklet print, and it is set by the user. For this reason, the user can suitably specify the intended completion output size, and thus wrong print can be prevented.

According to the embodiment, when the print paper size and the completion output size are specified, another attributes are reviewed automatically. For this reason, when the print paper size should be changed due to the specifying of the completion output size, the user does not have to change the print paper size, so that the operability is satisfactory.

(B) Another Embodiment

In the above embodiment, the expression of the option for specifying the relationship between the original paper size and the print paper size in the booklet print includes an expression of both the specific sizes such as "A5 booklet on A4". The relationship between the original paper size and the print paper size may be, however, defined by another expression. For example, the relationship between the original paper size and the print paper size may be specifically defined by an expression such as "A4 booklet print with equal scale" or "A4 booklet print with reduction scale". In another method, the relationship between the original paper size and the print paper size may be specifically defined by an expression such as "booklet print with equal scale where booklet is arranged on A3" or "booklet print with reduction scale on A4".

The above embodiment explains that the present invention is applied to the system which connects the PC 2 and the printer 3 (cable connection or wireless connection). The present invention can be, however, applied to another kinds of apparatuses such as a copying machine and a complex machine having the booklet print function similarly.

Further, although the embodiment explains the case where the present invention is applied to the booklet print function, the present invention can be also applied to the print function where plural sheets of original paper are arranged on one surface (or both surfaces) of paper. The present invention can be applied to the simple 2-in-1 print function where two sheets of original paper are arranged on the surface of paper.

What is claimed is:

1. A print setting apparatus where a plurality of original paper images are arranged on a surface of print paper, comprising:
   - display means for displaying a plurality of options for defining a relationship between a page image size and a print paper size;
   - first receiving means for receiving a choice of first option for defining the relationship between a first page image size and a first print paper size;
   - second receiving means for receiving a second print paper size; and
   - changing means for changing the first option to a second option for defining the relationship between a second page image size and the second print paper size in accordance with the setting of the second print paper size.

2. The print setting apparatus according to claim 1, further comprising storage means for storing a plurality of options for specifying a specific relationship between the page image size and the print paper size, wherein the display means displays the options stored in the storage means.

3. The print setting apparatus according to claim 1, wherein the first receiving means sets one of the plurality of options.

4. The print setting apparatus according to claim 1, wherein, when the first receiving means receives a choice of third option for defining a relationship between a third page image size and a third print paper size to be changed in the first option, the first receiving means reviews the second option changed by the relationship reviewing means.

5. The print setting apparatus according to claim 1, wherein a print type where a plurality of original paper images are arranged on the surface of print paper is booklet print used for creating a booklet.

6. A print setting method where a plurality of original paper images are arranged on a surface of print paper, comprising:
   - displaying a plurality of options for defining a relationship between a page image size and a print paper size;
   - receiving a choice of first option for defining the relationship between a first page image size and a first print paper size;
   - receiving a second print paper size; and
   - changing the first option to a second option for defining the relationship between a second page image size and the second print paper size in accordance with the setting of the second print paper size.

7. The print setting method according to claim 6, further comprising storing a plurality of options for specifying a specific relationship between the page image size and the print paper size, wherein the displaying step displays the options stored in the storing step.

8. The print setting method according to claim 6, wherein the first receiving step sets one of the plurality of options.

9. The print setting method according to claim 6, wherein, when the first receiving step receives a choice of third option for defining a relationship between a third page image size and a third print paper size to be changed in the first option, the first receiving step reviews the second option changed by the relationship reviewing step.

10. The print setting method according to claim 6, wherein a print type where a plurality of original paper images are arranged on the surface of print paper is booklet print used for creating a booklet.

11. A print setting apparatus where a plurality of original paper images are arranged on a surface of print paper, comprising:
    - a display unit displaying a plurality of options for defining a relationship between a page image size and a print paper size;
    - a first receiving section at the display unit, receiving a choice of first option for defining the relationship between a first page image size and a first print paper size;
    - a second receiving section at the display unit, receiving a second print paper size; and
    - a controller changing the first option to a second option for defining the relationship between a second page image size and the second print paper size in accordance with the setting of the second print paper size.

12. The print setting apparatus according to claim 11, further comprising a storage unit storing a plurality of options for specifying a specific relationship between the page image size and the print paper size, wherein the display unit displays the options stored in the storage unit.

13. The print setting apparatus according to claim 11, wherein the first receiving section sets one of the plurality of options.

14. The print setting apparatus according to claim 11, wherein, when the first receiving section receives a choice of third option for defining a relationship between a third page image size and a third print paper size to be changed in the first option, the first receiving section reviews the second option changed by the relationship reviewing section.

15. The print setting apparatus according to claim 11, wherein a print type where a plurality of original paper images are arranged on the surface of print paper is booklet print used for creating a booklet.

* * * * *